Patented Feb. 13, 1923.

1,444,989

UNITED STATES PATENT OFFICE.

WILHELM VOSS, OF JENA, GERMANY, ASSIGNOR TO SCHOTT & GEN, OF JENA, GERMANY, A FIRM.

PROCESS OF OBTAINING SODIUM DEKABORATE FROM BORONATROCALCITE.

No Drawing.    Application filed February 26, 1921.   Serial No. 448,198.

*To all whom it may concern:*

Be it known that I, WILHELM VOSS, a citizen of the German Empire, residing at Jena, Germany, have invented a new and useful Process of Obtaining Sodium Dekaborate from Boronatrocalcite, of which the following is a specification.

According to the invention the boronatrocalcite is combined with just so much of either water and sulphuric acid or dilute solution (e. g. dilute watery boric acid solution of 5° to 6° Be.) and sulphuric acid, that no boric acid reaction takes place, and is heated to about 75°. This causes a sludge to separate, consisting of calcium sulphate and unattacked boron lime, while in the solution, which may be easily separated from this sludge, there is contained a salt ($Na_2O$, $5B_2O_3$, $10H_2O$), the so-called sodium dekaborate (cf. Gmelin-Kraut, Handbuch der Anorganischen Chemie, 7th edition, Vol. II, Section I, Heidelberg, 1906, page 421 seq.), which is produced by the boric acid, formed during the process, combining with the borax contained in the boronatrocalcite. If the above mentioned sludge be combined with weak boric acid solution and so much sulphuric acid that acid reaction will take place, the residue will consist only of calcium sulphate sludge, which can be separated from the boric acid solution by filtering and washing until neutral reaction takes place. The sodium dekaborate, which can be obtained by the new process, is a relatively valuable substance, for instance for the manufacture of iron enamel; furthermore, there is nothing to prevent borax being obtained from this salt.

I claim:

1. Process of obtaining sodium dekaborate from boronatrocalcite, characterized by the feature that this substance is combined with just so much of a dilute solution of boric acid and sulphuric acid as is required for obtaining sodium dekaborate, and is heated to about 75°.

2. Process of obtaining sodium dekaborate from boronatrocalcite, characterized by the feature that this substance is combined with just so much of water and sulphuric acid as is required for obtaining sodium dekaborate, and is heated to about 75°.

WILHELM VOSS.

Witnesses:
  PAUL KRÜGER,
  FRITZ SANDER.